(12) United States Patent
Bender et al.

(10) Patent No.: US 11,308,273 B2
(45) Date of Patent: Apr. 19, 2022

(54) PRESCAN DEVICE ACTIVATION PREVENTION

(71) Applicant: INTERNATIONAL BUSINESS MACHINES CORPORATION, Armonk, NY (US)

(72) Inventors: Michael Bender, Rye Brook, NY (US); Jeremy R. Fox, Georgetown, TX (US); Kulvir Singh Bhogal, Fort Worth, TX (US); Craig M. Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 16/411,640

(22) Filed: May 14, 2019

(65) Prior Publication Data

US 2020/0364296 A1  Nov. 19, 2020

(51) Int. Cl.
*G06F 40/205* (2020.01)
*G10L 25/51* (2013.01)
*G06F 16/483* (2019.01)
*G10L 15/02* (2006.01)
*G06F 40/284* (2020.01)

(52) U.S. Cl.
CPC .......... *G06F 40/205* (2020.01); *G06F 16/483* (2019.01); *G06F 40/284* (2020.01); *G10L 15/02* (2013.01); *G10L 25/51* (2013.01); *G10L 2015/025* (2013.01)

(58) Field of Classification Search
CPC ... G10L 15/00; G10L 15/02; G10L 2015/025; G10L 25/51; G06F 16/00; G06F 16/483; G06F 40/00; G06F 40/205; G06F 40/284
See application file for complete search history.

(56) References Cited

U.S. PATENT DOCUMENTS

| 5,899,972 | A  | 5/1999  | Miyazawa |
|-----------|----|---------|----------|
| 6,158,005 | A  | 12/2000 | Bharathan |
| 6,466,654 | B1 | 10/2002 | Cooper |
| 6,594,630 | B1 | 7/2003  | Zlokarnik |

(Continued)

OTHER PUBLICATIONS

Mell, Peter et al.; "The NIST Definition of Cloud Computing;" National Institute of Standards and Technology; Special Publication 800-145; Sep. 2011; 7 pages.

(Continued)

*Primary Examiner* — Daniel C Washburn
*Assistant Examiner* — Sean E Serraguard
(74) *Attorney, Agent, or Firm* — Schmeiser, Olsen & Watts; Brian M. Restauro

(57) ABSTRACT

A method and system for improving audio detection is provided. The method includes receiving activation term data and text data of a multimedia file. The text data is analyzed and potential phonetic matches between a set of terms and the activation term are determined. An audio portion of the multimedia file is analyzed with respect to the potential phonetic matches and a resulting subset of terms is determined. A term is selected from the subset and flagged. An associated control action for preventing an automated device from being enabled is generated and stored. Presentation of the flagged term is detected within the multimedia file being presented and the control action is executed such that the automated device remains in the deactivated state.

17 Claims, 7 Drawing Sheets

(56) References Cited

U.S. PATENT DOCUMENTS

| | | | |
|---|---|---|---|
| 6,973,256 B1* | 12/2005 | Dagtas | G11B 27/105 |
| | | | 386/241 |
| 7,620,549 B2 | 11/2009 | Di Cristo | |
| 9,112,984 B2 | 8/2015 | Sejnoha | |
| 9,275,637 B1 | 3/2016 | Salvador | |
| 9,548,053 B1 | 1/2017 | Basye | |
| 9,691,378 B1* | 6/2017 | Meyers | G10L 15/04 |
| 9,728,188 B1 | 8/2017 | Rosen | |
| 9,934,777 B1* | 4/2018 | Joseph | G10L 15/063 |
| 2006/0212897 A1* | 9/2006 | Li | H04N 21/6125 |
| | | | 725/32 |
| 2007/0198259 A1* | 8/2007 | Karas | H04N 21/2353 |
| | | | 704/235 |
| 2008/0091426 A1 | 4/2008 | Rempel | |
| 2013/0289987 A1* | 10/2013 | Ganapathiraju | G10L 15/04 |
| | | | 704/236 |
| 2013/0289994 A1 | 10/2013 | Newman | |
| 2014/0278435 A1 | 9/2014 | Ganong, III | |
| 2017/0147576 A1* | 5/2017 | Des Jardins | G06F 16/48 |
| 2018/0130469 A1* | 5/2018 | Gruenstein | G06F 3/167 |
| 2020/0090646 A1* | 3/2020 | Smith | G10L 15/32 |

OTHER PUBLICATIONS

Burke, Samuel; Google admits its new smart speaker was eavesdropping on users; CNN.com; Oct. 12, 2017; 5 pages.

* cited by examiner

PRESCAN DEVICE ACTIVATION PREVENTION

FIELD

The present invention relates generally to a method for detecting potential audio activation terms and in particular to a method and associated system for improving automated device activation technology associated with detecting and flagging potential activation terms executing control actions for enabling an automated device to remain in said deactivated state.

BACKGROUND

Accurately controlling device functionality typically includes an inaccurate process with little flexibility. Modifying device functionality associated with audible based controls may include a complicated process that may be time consuming and require a large amount of resources.

SUMMARY

A first aspect of the invention provides an audio detection method comprising: receiving, by a processor of a control device from a user, data indicating an activation term associated with enabling an automated device from a deactivated state; retrieving, by the processor, text data associated with a multimedia file; first analyzing, by the processor, the text data; determining, by the processor based on results of the first analyzing, potential phonetic matches between a set of terms of the text data and the activation term; detecting, by the processor via an audio sensor, the multimedia file being potentially activated; second analyzing, by the processor, an audio portion of the multimedia file with respect to the potential phonetic matches; determining, by the processor based on results of the second analyzing, a subset of terms of the set of terms, wherein the subset of terms are determined to potentially and inadvertently enable the automated device from the deactivated state; selecting, by the processor, at least one term of the subset of terms determined to comprise a phonetic match to the activation term, wherein the phonetic match indicates the at least one term being associated with an action for inadvertently enabling the automated device from the deactivated state; flagging, by the processor based on results of the selecting, the at least one term; generating, by the processor, a control action for preventing the automated device from being enabled from the deactivated state; storing within a memory structure, by the processor, the at least one term with an associated flag and the control action; detecting, by the processor within the multimedia file being presented via a multimedia device, presentation of the at least one term; and executing, by the processor based on results of the detecting the presentation, the control action such that the automated device remains in the deactivated state.

A second aspect of the invention provides a computer program product, comprising a computer readable hardware storage device storing a computer readable program code, the computer readable program code comprising an algorithm that when executed by a processor of a control device implements an audio detection method, the method comprising: receiving, by the processor from a user, data indicating an activation term associated with enabling an automated device from a deactivated state; retrieving, by the processor, text data associated with a multimedia file; first analyzing, by the processor, the text data; determining, by the processor based on results of the first analyzing, potential phonetic matches between a set of terms of the text data and the activation term; detecting, by the processor via an audio sensor, the multimedia file being potentially activated; second analyzing, by the processor, an audio portion of the multimedia file with respect to the potential phonetic matches; determining, by the processor based on results of the second analyzing, a subset of terms of the set of terms, wherein the subset of terms are determined to potentially and inadvertently enable the automated device from the deactivated state; selecting, by the processor, at least one term of the subset of terms determined to comprise a phonetic match to the activation term, wherein the phonetic match indicates the at least one term being associated with an action for inadvertently enabling the automated device from the deactivated state; flagging, by the processor based on results of the selecting, the at least one term; generating, by the processor, a control action for preventing the automated device from being enabled from the deactivated state; storing within a memory structure, by the processor, the at least one term with an associated flag and the control action; detecting, by the processor within the multimedia file being presented via a multimedia device, presentation of the at least one term; and executing, by the processor based on results of the detecting the presentation, the control action such that the automated device remains in the deactivated state.

A third aspect of the invention provides a control device comprising a processor coupled to a computer-readable memory unit, the memory unit comprising instructions that when executed by the processor implements an audio detection method comprising: receiving, by the processor from a user, data indicating an activation term associated with enabling an automated device from a deactivated state; retrieving, by the processor, text data associated with a multimedia file; first analyzing, by the processor, the text data; determining, by the processor based on results of the first analyzing, potential phonetic matches between a set of terms of the text data and the activation term; detecting, by the processor via an audio sensor, the multimedia file being potentially activated; second analyzing, by the processor, an audio portion of the multimedia file with respect to the potential phonetic matches; determining, by the processor based on results of the second analyzing, a subset of terms of the set of terms, wherein the subset of terms are determined to potentially and inadvertently enable the automated device from the deactivated state; selecting, by the processor, at least one term of the subset of terms determined to comprise a phonetic match to the activation term, wherein the phonetic match indicates the at least one term being associated with an action for inadvertently enabling the automated device from the deactivated state; flagging, by the processor based on results of the selecting, the at least one term; generating, by the processor, a control action for preventing the automated device from being enabled from the deactivated state; storing within a memory structure, by the processor, the at least one term with an associated flag and the control action; detecting, by the processor within the multimedia file being presented via a multimedia device, presentation of the at least one term; and executing, by the processor based on results of the detecting the presentation, the control action such that the automated device remains in the deactivated state.

The present invention advantageously provides a simple method and associated system capable of accurately controlling device functionality.

DETAILED DESCRIPTION

Figure 1:
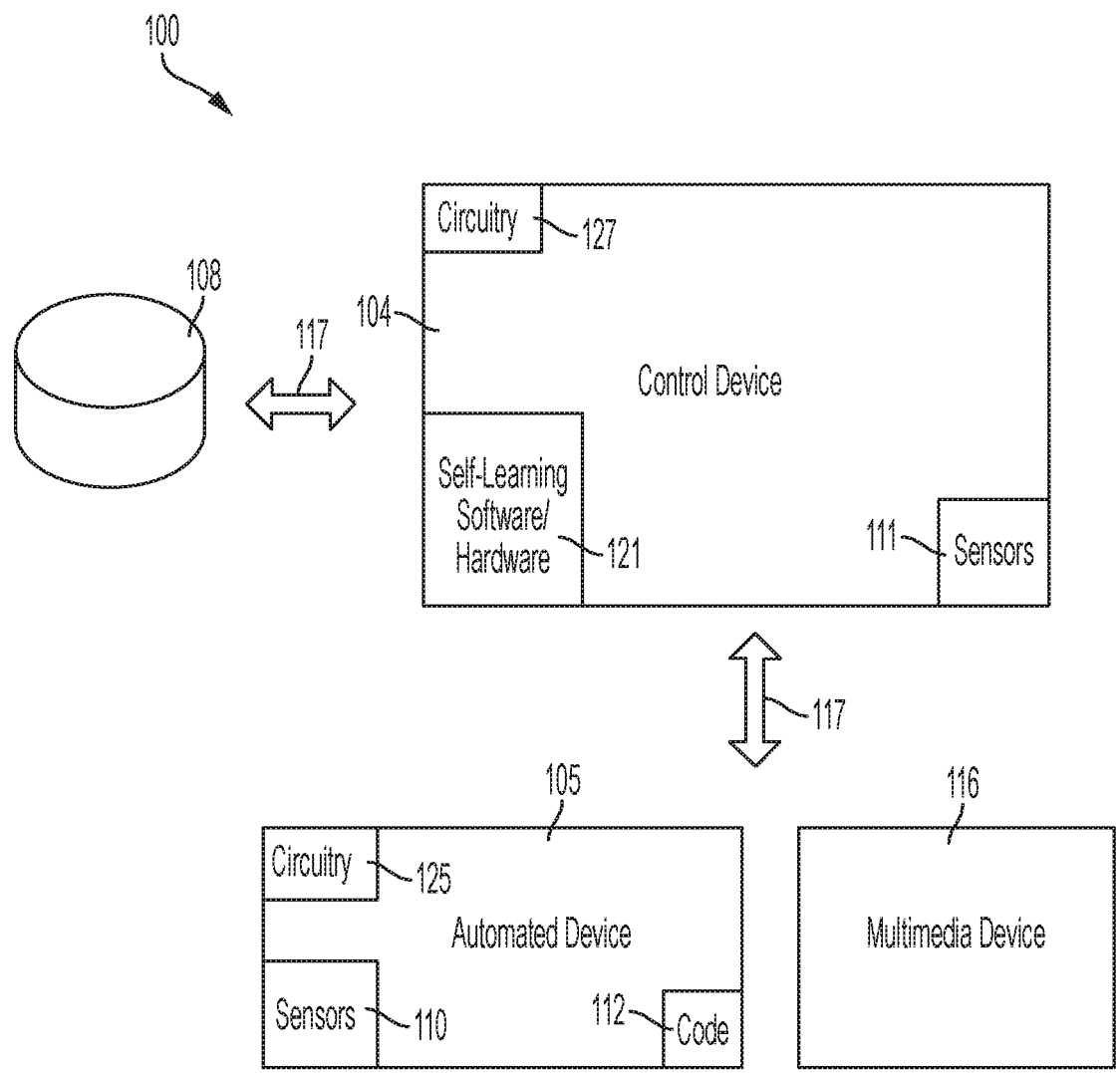
FIG. 1 illustrates a system for improving automated device activation technology associated with detecting and flagging potential activation terms executing control actions for enabling an automated device to remain in said deactivated state, in accordance with embodiments of the present invention.

FIG. 1 illustrates a system 100 for improving automated device activation technology associated with detecting and flagging potential activation terms executing control actions for enabling an automated device to remain in said deactivated state, in accordance with embodiments of the present invention. Typical media systems may allow for scanning content that may accidentally trigger a listening device. The scanned content may include audio that may trigger a listening device even if the audio does not include an exact match with a wake-up word for any given device. Additionally, a process for reviewing every audio sound may be very time-consuming and limiting and may include significant privacy concerns and security risks. Therefore, system 100 enables an improved process for analyzing an audio signal and determining any audible terms may inadvertently trigger a listening device to become active.

System 100 enables phonetic analysis process for identifying possible erroneous listening device trigger terms and pre-processing an associated audio signal via a cloud server at a service provider location. Alternatively, system 100 may pre-process the associated audio signal at a cloud location that initiates an audio sequence to determine if it would trigger the listening device. A technical advantage of the aforementioned two-pass system includes a reduction in audio analysis configuration time thereby reducing an audio signal processing cycle. System 100 enables the following process for optimizing pre-processing of audible content capable of erroneously triggering a wakeup of a listening (e.g., automated device 105) device as follows:

Audio and associated text data (of a multimedia file) is ingested by the system. In response, a phonetic analysis process of the audio and text data is executed to identify terms that are phonetically similar to a device wakeup (activation) term that may trigger a device to be activated from a deactivated state. The terms are processed through an activation term detection software engine and matched terms are flagged for future reference.

System 100 enables a process for ingesting audio and associated text data of a multimedia file as follows:

System 100 enables the audio and associated text data (including a location within the audio) to be transmitted to a control device for analysis. The control device receives the audio and associated text data (and associated language) from a source device (e.g., multimedia device 116). In response, control device validates that the text data includes appropriate timestamps and a personal activation term is entered into the system.

System 100 enables a process for analyzing the associated text data of the multimedia file (for phonetic similarities) as follows:

System 100 enables a first pass filtering process for execution with respect to possible words that may erroneously trigger activation of a device. In response, system 100 analyzes an activation term with respect to the audio and associated text data and identifies potential matches. An associated timestamp is configured for subsequent processes.

System 100 enables a process for analyzing the audio data of the multimedia file (for phonetic similarities) as follows:

System 100 inputs the audio data with respect to the previously identified timestamp and processes the audio data through a listening device engine. Audio data that triggers devices is identified and added to a flagged list of audio during a duration of the audio data being presented.

System 100 of FIG. 1 includes a control device 104 (i.e., specialized hardware device), an automated device 105 (i.e., specialized hardware device such as a voice activated an automated communication speaker, an automated communication device, etc.), and a database 108 (e.g., a cloud-based system) interconnected through a network 117. Control device 104 and automated device 105 include specialized circuitry 127 and 125, respectively (that may include specialized software), and self-learning software/hardware structure 121 and 112, respectively (i.e., including self-learning software code), and sensors 110 and 111, respectively. Automated device 105 may be Bluetooth enabled to provide connectivity to any type of system. Sensors 110 and 111 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, temperature sensors, etc. Control device 104, automated device 105, and database 108 may each comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, control device 104, automated device 105, and database 108 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving automated device activation technology associated with detecting and flagging potential activation terms executing control actions for enabling an automated device to remain in said deactivated state. Network 117 may include any type of network including, inter alia, a local area network, (LAN), a wide area network (WAN), the Internet, a wireless network, etc. Alternatively, network 117 may include an application programming interface (API).

The following details associated with system 100 describe processes for detecting and flagging potential activation terms.

The process is initiated when potential audio and associated text (for presentation) comprising time stamps is ingested by the system. Subsequently, an activation term (i.e., associated with enabling an automated device from a deactivated state) is inputted into the system. In response, a phonetic analysis process (e.g., using natural language processing) is enabled for comparing the activation term to the associated text. The analysis process includes pre-processing the audio for close matches (with the activation term) via an audio engine, an actual listening device, or a software simulation. Detected audio portions (conflicting with the activation term) are flagged.

The following example described an alternative implementation scenario:

The scenario is executed when a user configures a smart speaker to respond to an activation term "Bob". Subsequently, the user enables a video/optical disc for playback. Associated video/media (of the video/optical disc) includes an associated transcript. The associated transcript is analyzed to determine if there are any possible portions of an audio track associated with the video/media that may inadvertently activate the smart speaker. For example, a portion of a script (of the video/media) includes a term "Vob". The term "Vob" is flagged as a possible problematic term in the video/media. Subsequently, an audio snippet associated the problematic term is analyzed by a pre-processing engine to determine if the smart speaker would actually be activated inadvertently. If the pre-processing engine confirms an issue, then the audio snippet is flagged (e.g., at 56 min, 3 seconds in the video). Therefore, when the video/media approaches to 56 min, 2 seconds, the smart speaker will be flagged for preventing activation at that point in the presentation.

System 100 is enabled to store analysis of custom activation terms and a tendency to inadvertently invoke a user's smart speakers when various media is played back. Therefore, system 100 is configured to automatically learn from playback of an episode of a video presentation that users a custom activation term "A" may have a smart speaker inadvertently invoked at 8 mins, 2 second into the playback of the presentation. Therefore, the smart speaker should be made aware.

Figure 2:
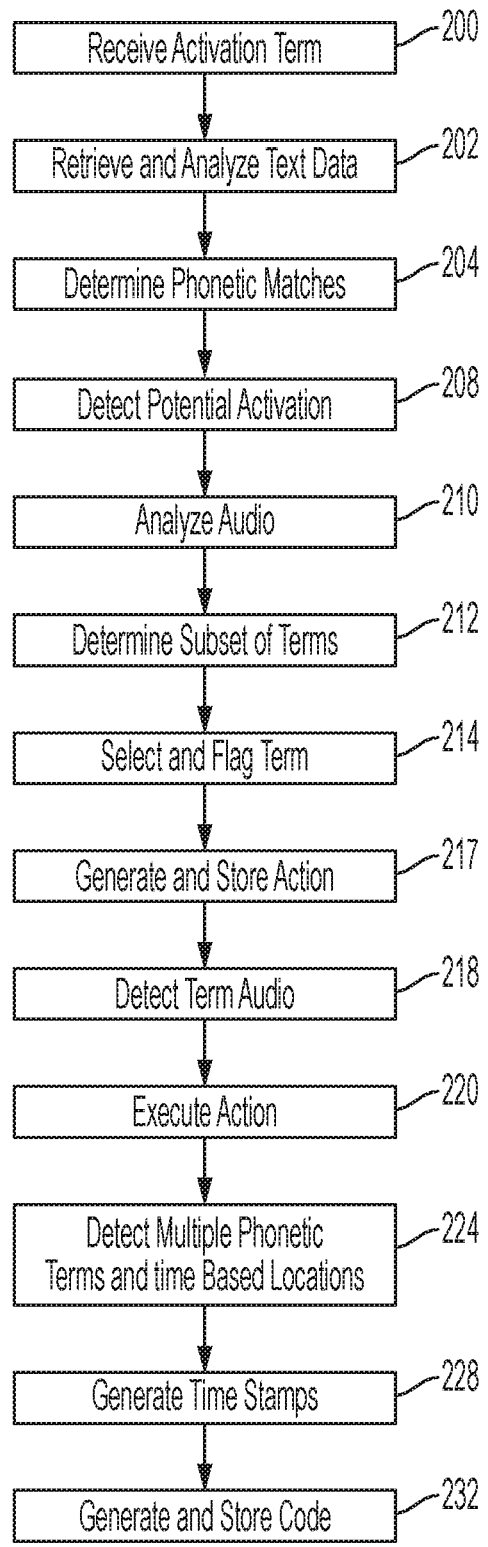
FIG. 2 illustrates an algorithm detailing a process flow enabled by the system of FIG. 1 for improving automated device activation technology associated with detecting and flagging potential activation terms executing control actions for enabling an automated device to remain in said deactivated state, in accordance with embodiments of the present invention.

FIG. 2 illustrates an algorithm detailing a process flow enabled by system 100 of FIG. 1 for improving automated device activation technology associated with detecting and flagging potential activation terms executing control actions for enabling an automated device to remain in said deactivated state, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by control device 104 and automated device 105. In step 200, data indicating an activation term associated with enabling an automated device from a deactivated state is received from a user. In step 202, text data associated with a multimedia file (audio file, video file, audio/video file, etc.) is retrieved and analyzed. In step 204, potential phonetic matches between a set of terms of the text data and the activation term are determined based on results of the analysis. In step 208, the multimedia file being potentially activated is detected via an audio sensor. In step 210, an audio portion of the multimedia file is analyzed with respect to the potential phonetic matches. The analysis may include analyzing closed caption metadata of the audio portion. In step 212, a subset of terms of the set of terms is selected based on results of step 210. The subset of terms are determined to potentially and inadvertently enable the automated device from the deactivated state. In step 214, at least one term of the subset of terms is selected. The at least one term is determined to comprise a phonetic match to the activation term. The phonetic match indicates the at least one term being associated with an action for inadvertently enabling the automated device from the deactivated state. Selecting the least one term may include executing an emulation test. The at least one term is flagged based on results of the selection.

In step 217, a control action for preventing the automated device from being enabled from the deactivated state is generated and stored within a memory structure (e.g., internal or external to the control device). The control action is stored with the at least one term and an associated flag. In step 218, presentation of the at least one term is detected within the multimedia file being presented via a multimedia device. In step 220, the control action is executed such that the automated device remains in the deactivated state. In step 224, a plurality of phonetic match terms are detected. The plurality of phonetic match terms are associated with additional custom activation terms for enabling additional automated devices from a deactivated state. Additionally, specified time-based locations are detected. The specified time-based locations are associated with the plurality of phonetic match terms occurring within the audio portion. In step 228, time stamps associated with the specified time-based locations are generated. In step 228, analysis code associated with the plurality of phonetic match terms and the time stamps is generated and stored within the memory structure. The analysis code is configured for execution of future audio detection processes.

Figure 3:
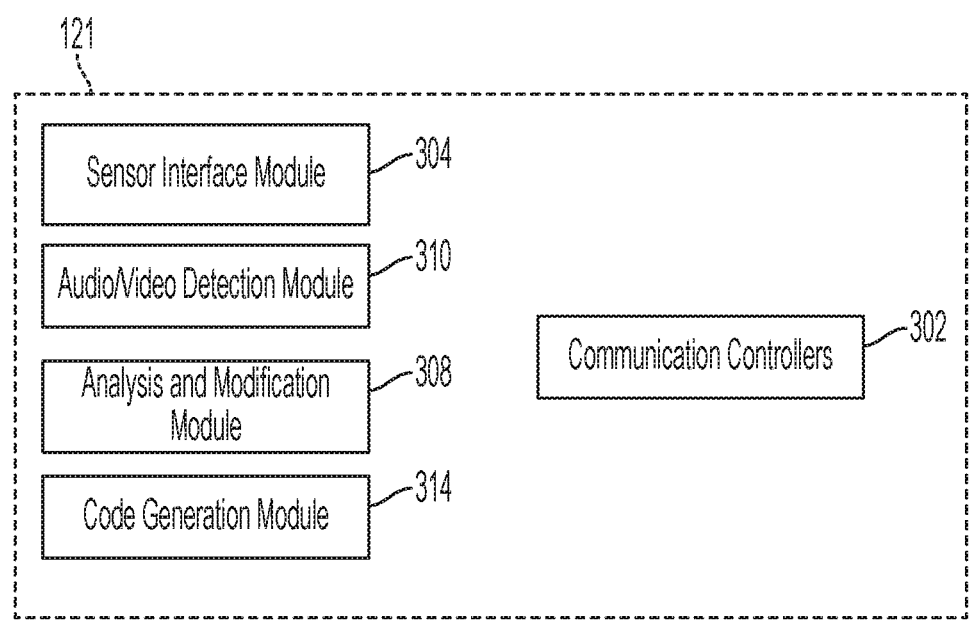
FIG. 3 illustrates an internal structural view of the self-learning software/hardware structure of FIG. 1, in accordance with embodiments of the present invention.

FIG. 3 illustrates an internal structural view of self-learning software/hardware structure 121 (or code 112 and circuitry 125) of FIG. 1, in accordance with embodiments of the present invention. Self-learning software/hardware structure 121 includes a sensor interface module 304, an audio video detection module 310, an analysis and identification module 308, a code generation module 314, and communication controllers 302. Sensor interface module 304 comprises specialized hardware and software for controlling all functions related to sensors 110 and 111 of FIG. 1. Audio video detection module 310 comprises specialized hardware and software for controlling all functionality related to audio, video, and text detection for determining phonetic matches and generating associated actions for implementing the process described with respect to the algorithm of FIG. 2. Analysis and identification module 308 comprises specialized hardware and software for controlling all functions related to the analysis steps of FIG. 2. Code generation module 314 comprises specialized hardware and software for controlling all functions related to generating self-learning software code for executing future function detection and control processes. Communication controllers 302 are enabled for controlling all communications between sensor interface module 304, audio video detection module 310, analysis and identification module 308, and code generation module 314.

Figure 4:
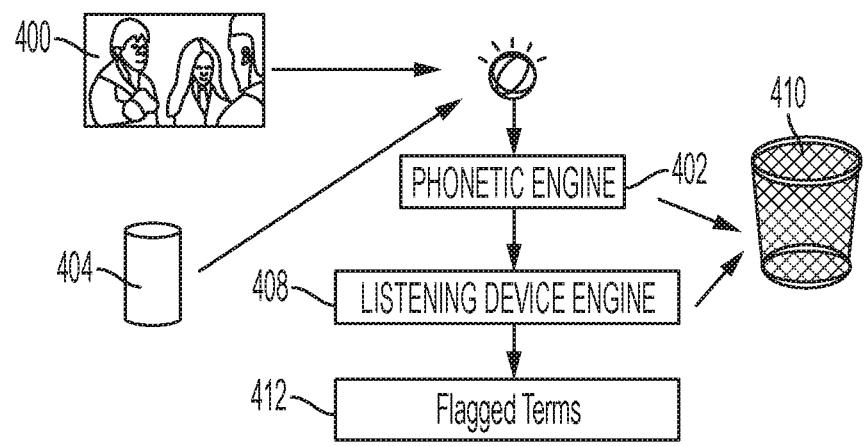
FIG. 4 illustrates an implementation example comprising a process for generating flagged terms and associated actions, in accordance with embodiments of the present invention.

FIG. 4 illustrates an implementation example comprising a process for generating flagged terms and associated actions, in accordance with embodiments of the present invention. The process is initiated when audio and text content 400 (for processing with respect to similar words as a personal activation term) are transmitted to a phonetic engine system 402. Likewise, the activation term is transmitted (from an automated listening device 404) to the system 402. System 402 phonetically analyzes audio and text content 400 for any term that include similar sounds with respect to the personal activation term. Terms associated with the potential to cause an issue are matched with actual audio from audio and text content 400 and are transmitted to be executed via a listening device engine 408 to determine if they trigger an activation of automated listening device 404. Terms that are not causing issues are discarded within a structure 410. Detected audio causing issues is added to a temporal flag list 412.

Figure 5:
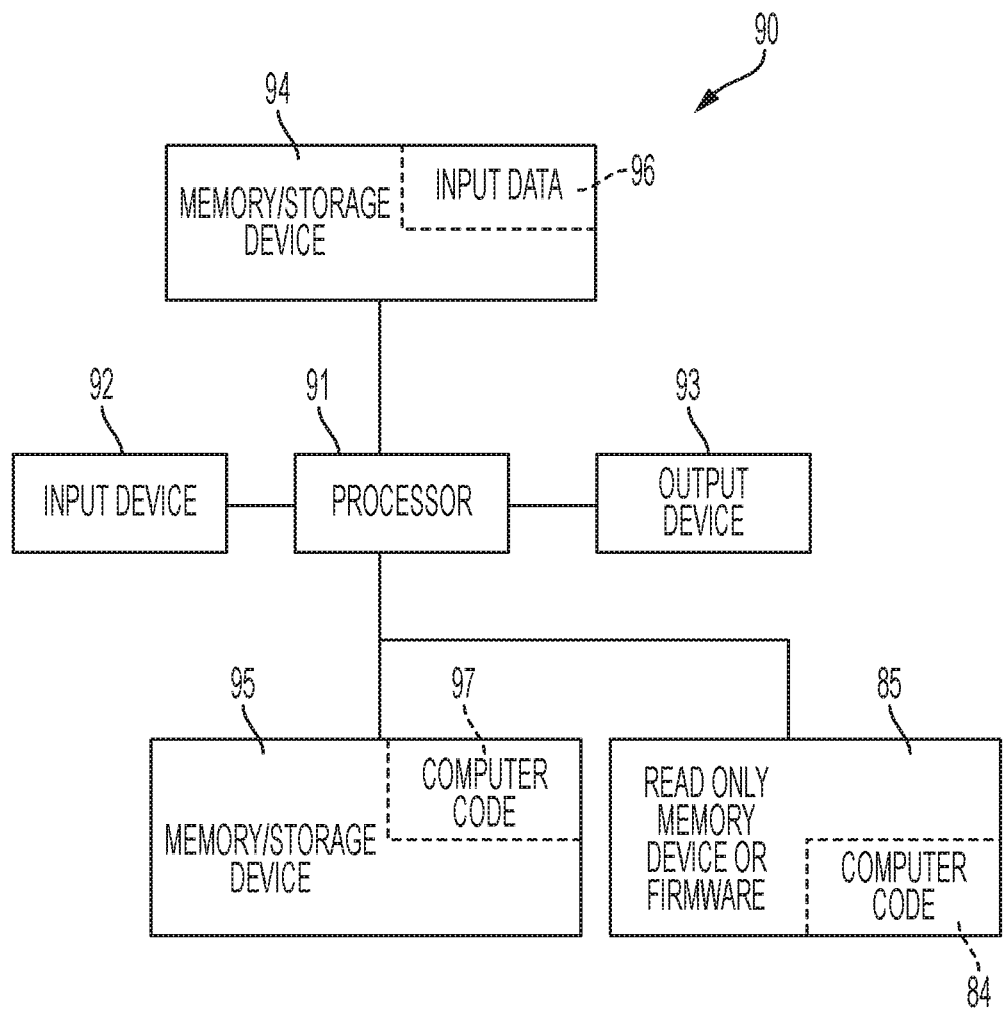
FIG. 5 illustrates a computer system used by the system of FIG. 1 for improving automated device activation technology associated with detecting and flagging potential activation terms executing control actions for enabling an automated device to remain in said deactivated state, in accordance with embodiments of the present invention.

FIG. 5 illustrates a computer system 90 (e.g., automated device 105 and/or control device 104 of FIG. 1) used by or comprised by the system of FIG. 1 for improving automated device activation technology associated with detecting and flagging potential activation terms executing control actions for enabling an automated device to remain in said deactivated state, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving automated device activation technology associated with detecting and flagging potential activation terms executing control actions for enabling an automated device to remain in said deactivated state. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve automated device activation technology associated with detecting and flagging potential activation terms executing control actions for enabling an automated device to remain in said deactivated state. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for improving automated device activation technology associated with detecting and flagging potential activation terms executing control actions for enabling an automated device to remain in said deactivated state. In another embodiment, the invention provides a business method that performs the process steps of the invention on a subscription, advertising, and/or fee basis. That is, a service supplier, such as a Solution Integrator, could offer to enable a process for improving automated device activation technology associated with detecting and flagging potential activation terms executing control actions for enabling an automated device to remain in said deactivated state. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
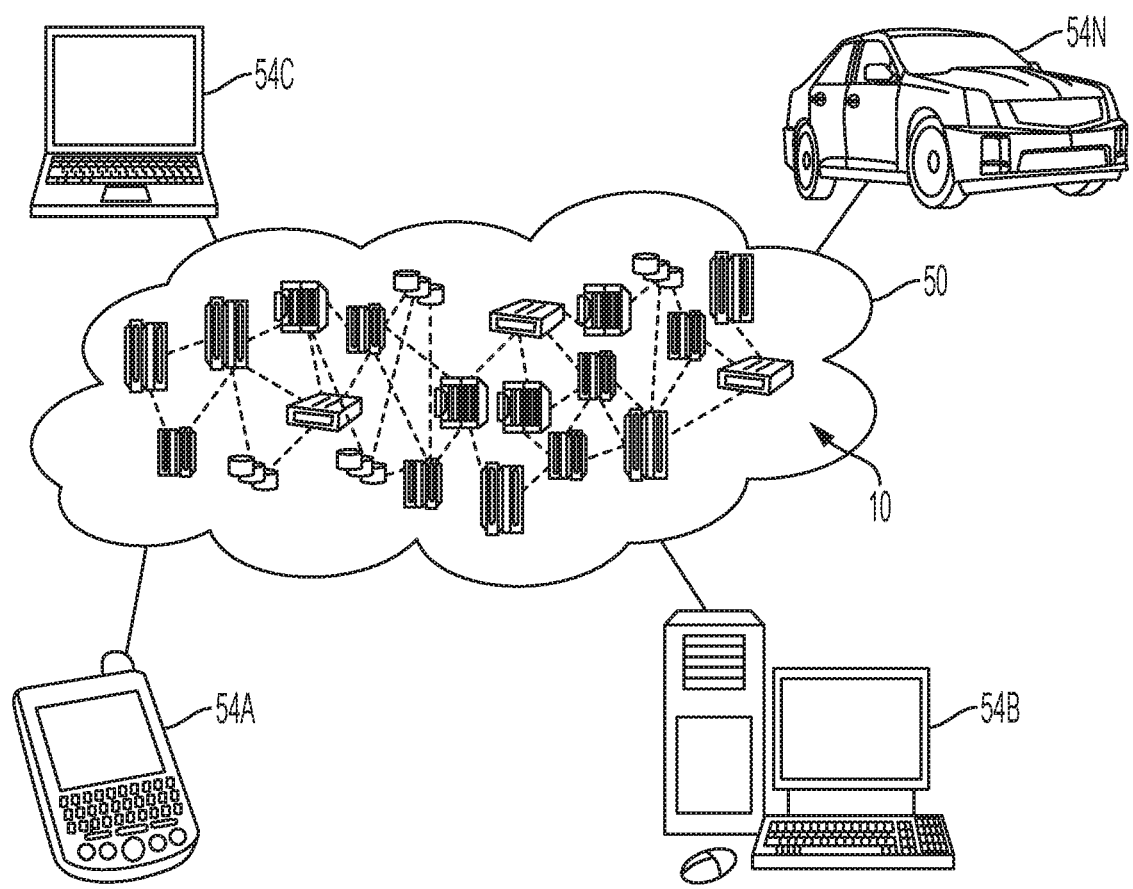
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 7:
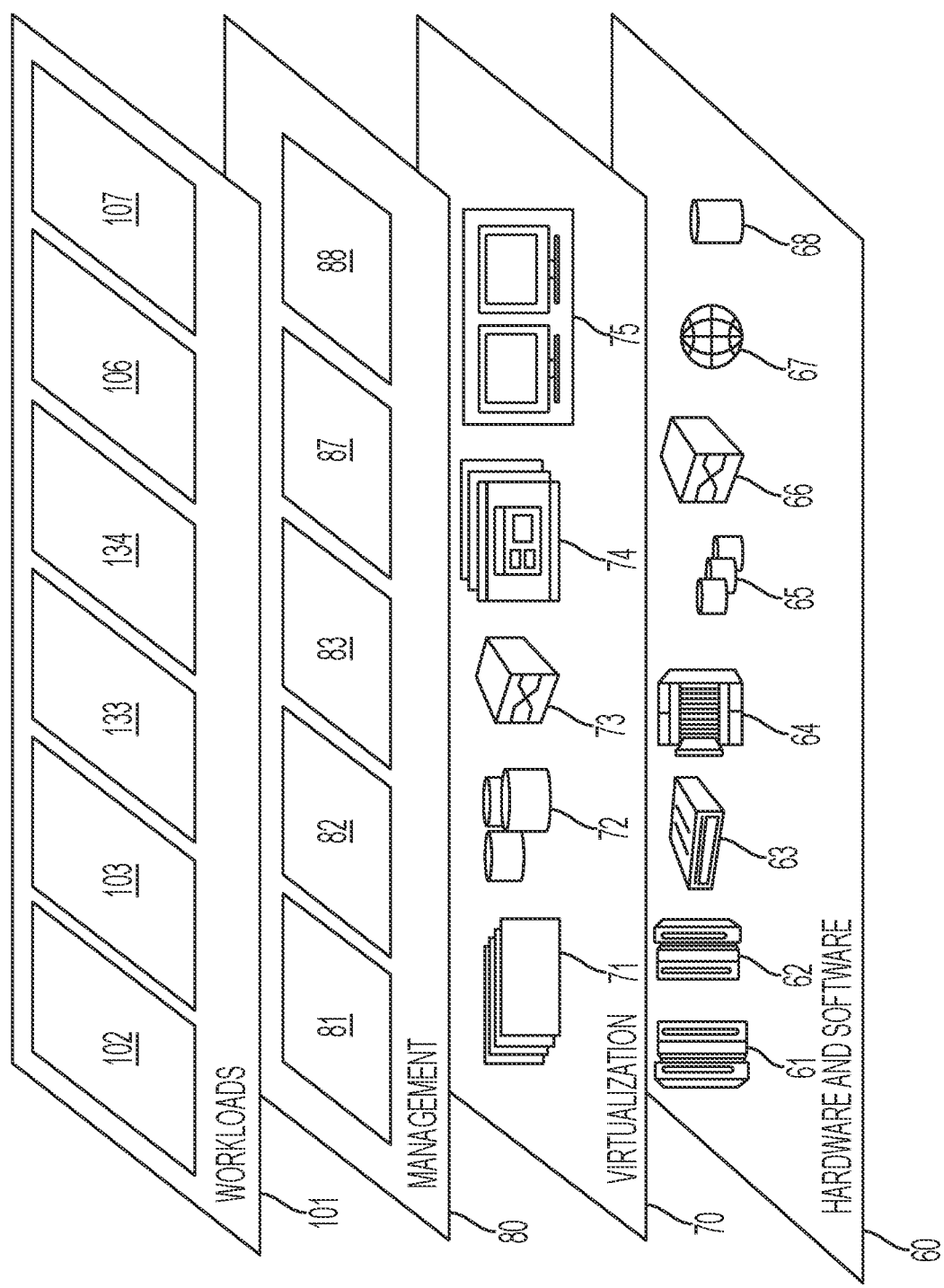
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving automated device activation technology associated with detecting and flagging potential activation terms executing control actions for enabling an automated device to remain in said deactivated state 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An audio detection method comprising:
receiving, by a processor of a control device from a user, data indicating an activation term associated with enabling an automated device from a deactivated state;
retrieving, by said processor, text data with respect to an associated language comprised by a transcript of a multimedia file comprising an audio and video file for user presentation;
first analyzing at a remote location, by said processor via a first pass filtering process, said text data, wherein said first analyzing comprises executing a phonetic analysis process via execution of natural language processing, and wherein said phonetic analysis process comprises phonetically comparing said activation term to terms of said text data;
configuring for subsequent processes, by said processor, associated timestamps at various locations within said text data;
determining, by said processor based on results of said first analyzing, potential phonetic matches between a set of terms of said terms of said text data and said activation term, wherein said set of terms are phonetically similar to but differing from said activation term;
initiating, by said processor, an audio sequence of said audio and video file, wherein said audio sequence represents said text data;
detecting, by said processor via an audio sensor, said audio sequence being potentially activated;
second analyzing, by said processor via a listening device engine, an audio portion and an associated location within said audio portion of said audio sequence with respect to said associated timestamps of said text data and said potential phonetic matches comprising phonetic similarities and sounds with respect to said activation term, wherein said second analyzing comprises: analyzing closed caption metadata of said audio portion;
determining, by said processor based on results of said second analyzing, a subset of terms of said set of terms, wherein said subset of terms comprise erroneous listening device trigger terms determined to potentially and inadvertently enable said automated device to be automatically activated from said deactivated state;
selecting, by said processor, at least one term of said subset of terms determined to comprise a phonetic match to but differing from said activation term, wherein said phonetic match indicates said at least one term being associated with an action for inadvertently enabling said automated device from said deactivated state;
presenting with respect to said associated timestamps, by said processor, enabled audio of said multimedia file comprising said subset of terms with respect to said automated device;
additionally determining, by said processor in response to said presenting, that said automated device has been enabled from said deactivated state in response to said at least one term;
flagging, by said processor based on results of said selecting and in response to said additionally determining, said at least one term for future reference, wherein said flagging comprises adding to a temporal flag list, detected audio, of said multimedia file, determined to cause said automated device to be inadvertently enabled from said deactivated state;
discarding, by said processor, a group of terms of said subset of terms determined not to enable said automated device from said deactivated state, wherein said discarding comprises adding said group of terms to a specialized discarded term structure;
determining, by said processor, a specified time within said audio and video file, associated with a timestamp of said associated timestamps, within said multimedia file associated with an occurrence of said at least one term;
generating, by said processor, a control action for preventing said automated device from being enabled from said deactivated state;
storing within a memory structure, by said processor, said at least one term with an associated flag, a reference to said specified time, and said control action;
detecting during a subsequent timeframe with respect to a timeframe associated with said storing, by said processor within said multimedia file being presented via a multimedia device, presentation of said at least one term; and
executing, by said processor based on results of said detecting said presentation, said control action such that said automated device remains in said deactivated state during said specified time during play back of said multimedia file audibly presenting said at least one term.

2. The method of claim 1, further comprising:
detecting, by said processor, a plurality of phonetic match terms associated with additional custom activation terms for enabling additional automated devices from a deactivated state;
detecting, by said processor, specified time-based locations associated with said plurality of phonetic match terms occurring within said audio portion;

generating, by said processor, time stamps associated with said specified time-based locations;

generating, by said processor, analysis code associated with said plurality of phonetic match terms and said time stamps; and storing within said memory structure, by said processor, said analysis code for execution of future audio detection processes.

3. The method of claim 1, wherein said selecting said least one term determined to comprise a phonetic match to said activation term comprises executing an emulation test.

4. The method of claim 1, wherein said automated device comprises a device selected from the group consisting of an automated communication speaker and an automated communication device.

5. The method of claim 1, wherein said memory structure is internal to said control device.

6. The method of claim 1, wherein said memory structure is external to said control device.

7. The method of claim 1, wherein said multimedia file comprises a file selected from the group consisting of an audio file, a video file, and an audio and video file.

8. The method of claim 1, further comprising:
providing at least one support service for at least one of creating, integrating, hosting, maintaining, and deploying computer-readable code in the control device, said code being executed by the computer processor to implement: said receiving, said retrieving, said first analyzing, said determining said potential phonetic matches, said detecting said multimedia file being potentially activated, said second analyzing, said determining said subset of terms, said selecting, said flagging, said generating, said storing, said detecting said presentation, and said executing.

9. A computer program product, comprising a computer readable hardware storage device storing a computer readable program code, said computer readable program code comprising an algorithm that when executed by a processor of a control device implements an audio detection method, said method comprising:

receiving, by said processor from a user, data indicating an activation term associated with enabling an automated device from a deactivated state;

retrieving, by said processor, text data with respect to an associated language comprised by a transcript of a multimedia file comprising an audio and video file for user presentation;

first analyzing at a remote location, by said processor via a first pass filtering process, said text data, wherein said first analyzing comprises executing a phonetic analysis process via execution of natural language processing, and wherein said phonetic analysis process comprises phonetically comparing said activation term to terms of said text data;

configuring for subsequent processes, by said processor, associated timestamps at various locations within said text data;

determining, by said processor based on results of said first analyzing, potential phonetic matches between a set of terms of said terms of said text data and said activation term, wherein said set of terms are phonetically similar to but differing from said activation term;

initiating, by said processor, an audio sequence of said audio and video file, wherein said audio sequence represents said text data;

detecting, by said processor via an audio sensor, said audio sequence being potentially activated;

second analyzing, by said processor via a listening device engine, an audio portion and an associated location within said audio portion of said audio sequence with respect to said associated timestamps of said text data and said potential phonetic matches comprising phonetic similarities and sounds with respect to said activation term, wherein said second analyzing comprises: analyzing closed caption metadata of said audio portion;

determining, by said processor based on results of said second analyzing, a subset of terms of said set of terms, wherein said subset of terms comprise erroneous listening device trigger terms determined to potentially and inadvertently enable said automated device to be automatically activated from said deactivated state;

selecting, by said processor, at least one term of said subset of terms determined to comprise a phonetic match to but differing from said activation term, wherein said phonetic match indicates said at least one term being associated with an action for inadvertently enabling said automated device from said deactivated state;

presenting with respect to said associated timestamps, by said processor, enabled audio of said multimedia file comprising said subset of terms with respect to said automated device;

additionally determining, by said processor in response to said presenting, that said automated device has been enabled from said deactivated state in response to said at least one term;

flagging, by said processor based on results of said selecting and in response to said additionally determining, said at least one term for future reference, wherein said flagging comprises adding to a temporal flag list, detected audio, of said multimedia file, determined to cause said automated device to be inadvertently enabled from said deactivated state;

discarding, by said processor, a group of terms of said subset of terms determined not to enable said automated device from said deactivated state, wherein said discarding comprises adding said group of terms to a specialized discarded term structure;

determining, by said processor, a specified time within said audio and video file, associated with a timestamp of said associated timestamps, within said multimedia file associated with an occurrence of said at least one term;

generating, by said processor, a control action for preventing said automated device from being enabled from said deactivated state;

storing within a memory structure, by said processor, said at least one term with an associated flag, a reference to said specified time, and said control action;

detecting during a subsequent timeframe with respect to a timeframe associated with said storing, by said processor within said multimedia file being presented via a multimedia device, presentation of said at least one term; and executing, by said processor based on results of said detecting said presentation, said control action such that said automated device remains in said deactivated state during said specified time during play back of said multimedia file audibly presenting said at least one term.

10. The computer program product of claim 9, wherein said method further comprises:

detecting, by said processor, a plurality of phonetic match terms associated with additional custom activation terms for enabling additional automated devices from a deactivated state;

detecting, by said processor, specified time-based locations associated with said plurality of phonetic match terms occurring within said audio portion;

generating, by said processor, time stamps associated with said specified time-based locations;

generating, by said processor, analysis code associated with said plurality of phonetic match terms and said time stamps; and storing within said memory structure, by said processor, said analysis code for execution of future audio detection processes.

11. The computer program product of claim 9, wherein said selecting said least one term determined to comprise a phonetic match to said activation term comprises executing an emulation test.

12. The computer program product of claim 9, wherein said automated device comprises a device selected from the group consisting of an automated communication speaker and an automated communication device.

13. The computer program product of claim 9, wherein said memory structure is internal to said control device.

14. The computer program product of claim 9, wherein said memory structure is external to said control device.

15. The computer program product of claim 9, wherein said multimedia file comprises a file selected from the group consisting of an audio file, a video file, and an audio and video file.

16. A control device comprising a processor coupled to a computer-readable memory unit, said memory unit comprising instructions that when executed by the processor implements an audio detection method comprising:

receiving, by said processor from a user, data indicating an activation term associated with enabling an automated device from a deactivated state;

retrieving, by said processor, text data with respect to an associated language comprised by a transcript of a multimedia file comprising an audio and video file for user presentation;

first analyzing at a remote location, by said processor via a first pass filtering process, said text data, wherein said first analyzing comprises executing a phonetic analysis process via execution of natural language processing, and wherein said phonetic analysis process comprises phonetically comparing said activation term to terms of said text data;

configuring for subsequent processes, by said processor, associated timestamps at various locations within said text data;

determining, by said processor based on results of said first analyzing, potential phonetic matches between a set of terms of said terms of said text data and said activation term, wherein said set of terms are phonetically similar to but differing from said activation term;

initiating, by said processor, an audio sequence of said audio and video file, wherein said audio sequence represents said text data;

detecting, by said processor via an audio sensor, said audio sequence being potentially activated;

second analyzing, by said processor via a listening device engine, an audio portion and an associated location within said audio portion of said audio sequence with respect to said associated timestamps of said text data and said potential phonetic matches comprising phonetic similarities and sounds with respect to said activation term, wherein said second analyzing comprises: analyzing closed caption metadata of said audio portion;

determining, by said processor based on results of said second analyzing, a subset of terms of said set of terms, wherein said subset of terms comprise erroneous listening device trigger terms determined to potentially and inadvertently enable said automated device to be automatically activated from said deactivated state;

selecting, by said processor, at least one term of said subset of terms determined to comprise a phonetic match to but differing from said activation term, wherein said phonetic match indicates said at least one term being associated with an action for inadvertently enabling said automated device from said deactivated state;

presenting with respect to said associated timestamps, by said processor, enabled audio of said multimedia file comprising said subset of terms with respect to said automated device;

additionally determining, by said processor in response to said presenting, that said automated device has been enabled from said deactivated state in response to said at least one term;

flagging, by said processor based on results of said selecting and in response to said additionally determining, said at least one term for future reference, wherein said flagging comprises adding to a temporal flag list, detected audio, of said multimedia file, determined to cause said automated device to be inadvertently enabled from said deactivated state;

discarding, by said processor, a group of terms of said subset of terms determined not to enable said automated device from said deactivated state, wherein said discarding comprises adding said group of terms to a specialized discarded term structure;

determining, by said processor, a specified time within said audio and video file, associated with a timestamp of said associated timestamps, within said multimedia file associated with an occurrence of said at least one term;

generating, by said processor, a control action for preventing said automated device from being enabled from said deactivated state;

storing within a memory structure, by said processor, said at least one term with an associated flag, a reference to said specified time, and said control action;

detecting during a subsequent timeframe with respect to a timeframe associated with said storing, by said processor within said multimedia file being presented via a multimedia device, presentation of said at least one term; and executing, by said processor based on results of said detecting said presentation, said control action such that said automated device remains in said deactivated state during said specified time during play back of said multimedia file audibly presenting said at least one term.

17. The control device of claim 16, wherein said method further comprises:

detecting, by said processor, a plurality of phonetic match terms associated with additional custom activation terms for enabling additional automated devices from a deactivated state;

detecting, by said processor, specified time-based locations associated with said plurality of phonetic match terms occurring within said audio portion;
generating, by said processor, time stamps associated with said specified time-based locations;
generating, by said processor, analysis code associated with said plurality of phonetic match terms and said time stamps; and
storing within said memory structure, by said processor, said analysis code for execution of future audio detection processes.

* * * * *